No. 689,040. Patented Dec. 17, 1901.
H. DAVID & A. F. TROPHÈME.
WEIGHING APPARATUS COMBINED WITH A BARROW.
(Application filed Sept. 15, 1897.)
(No Model.) 7 Sheets—Sheet 1.
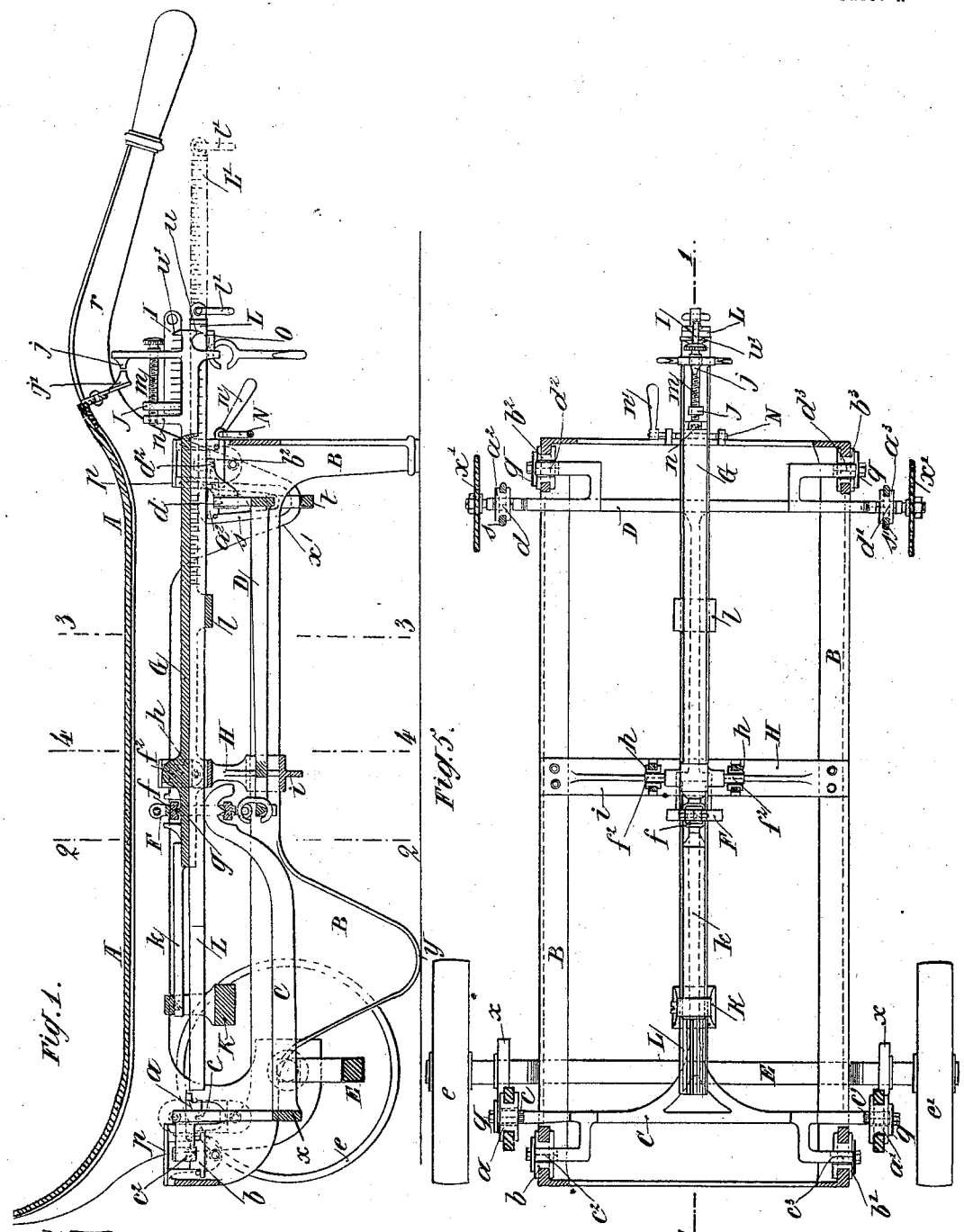

No. 689,040. Patented Dec. 17, 1901.
H. DAVID & A. F. TROPHÈME.
WEIGHING APPARATUS COMBINED WITH A BARROW.
(Application filed Sept. 15, 1897.)
(No Model.) 7 Sheets—Sheet 2.
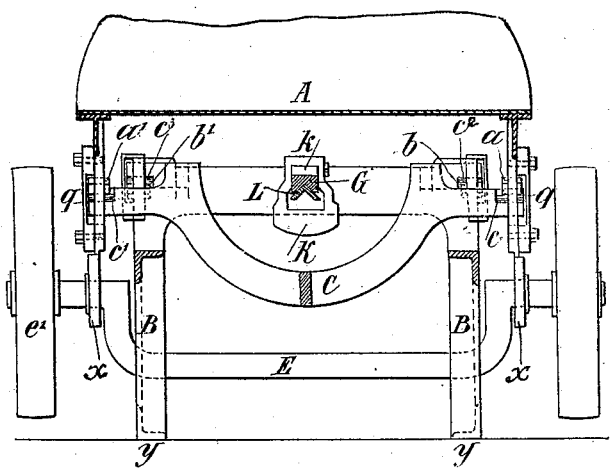
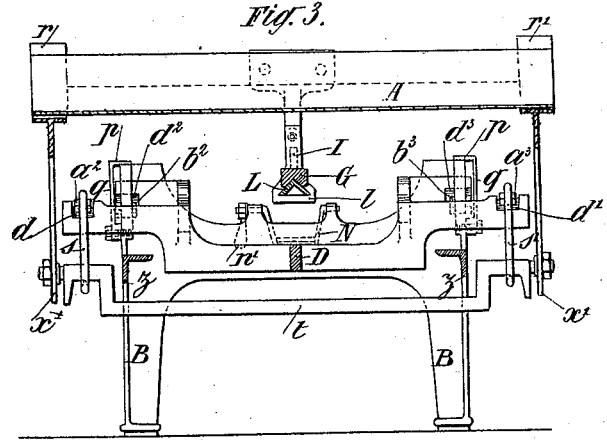
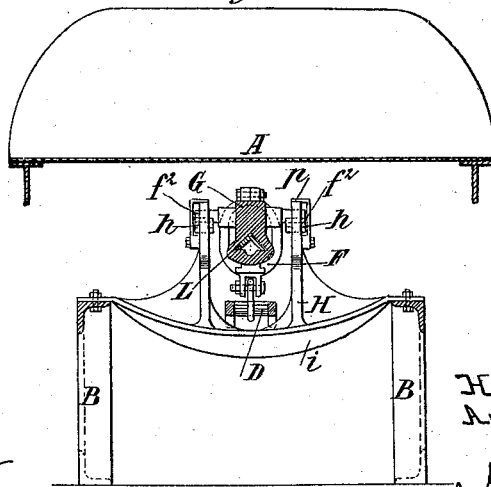
WITNESSES:
F. W. Wright
S. C. Connor
INVENTORS
HIPPOLYTE DAVID AND
ANTOINE FRANÇOIS TROPHÈME
BY
Howson and Howson
THEIR ATTORNEYS.

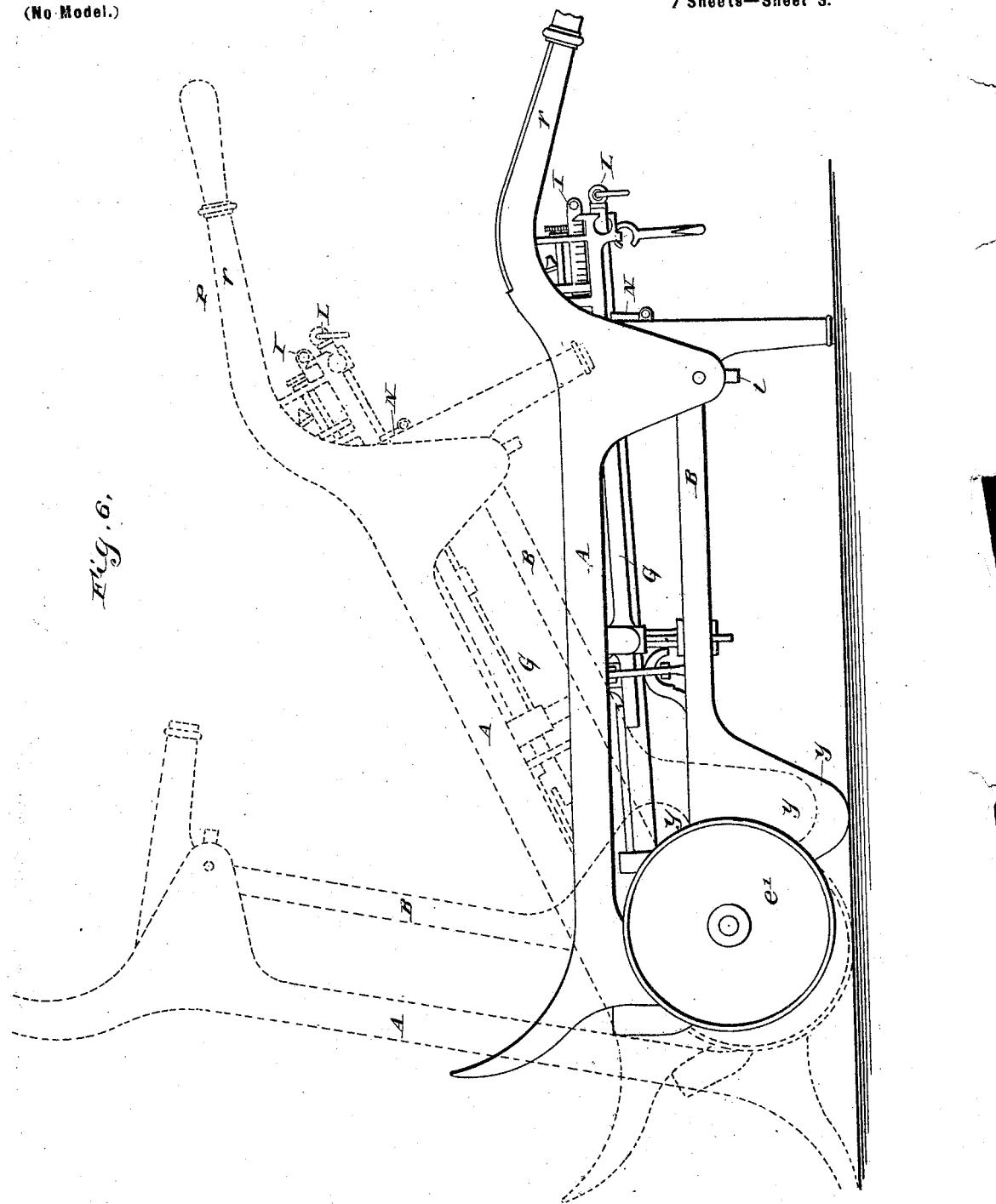

No. 689,040. Patented Dec. 17, 1901.
H. DAVID & A. F. TROPHÈME.
WEIGHING APPARATUS COMBINED WITH A BARROW.
(Application filed Sept. 15, 1897.)
(No Model.) 7 Sheets—Sheet 4.
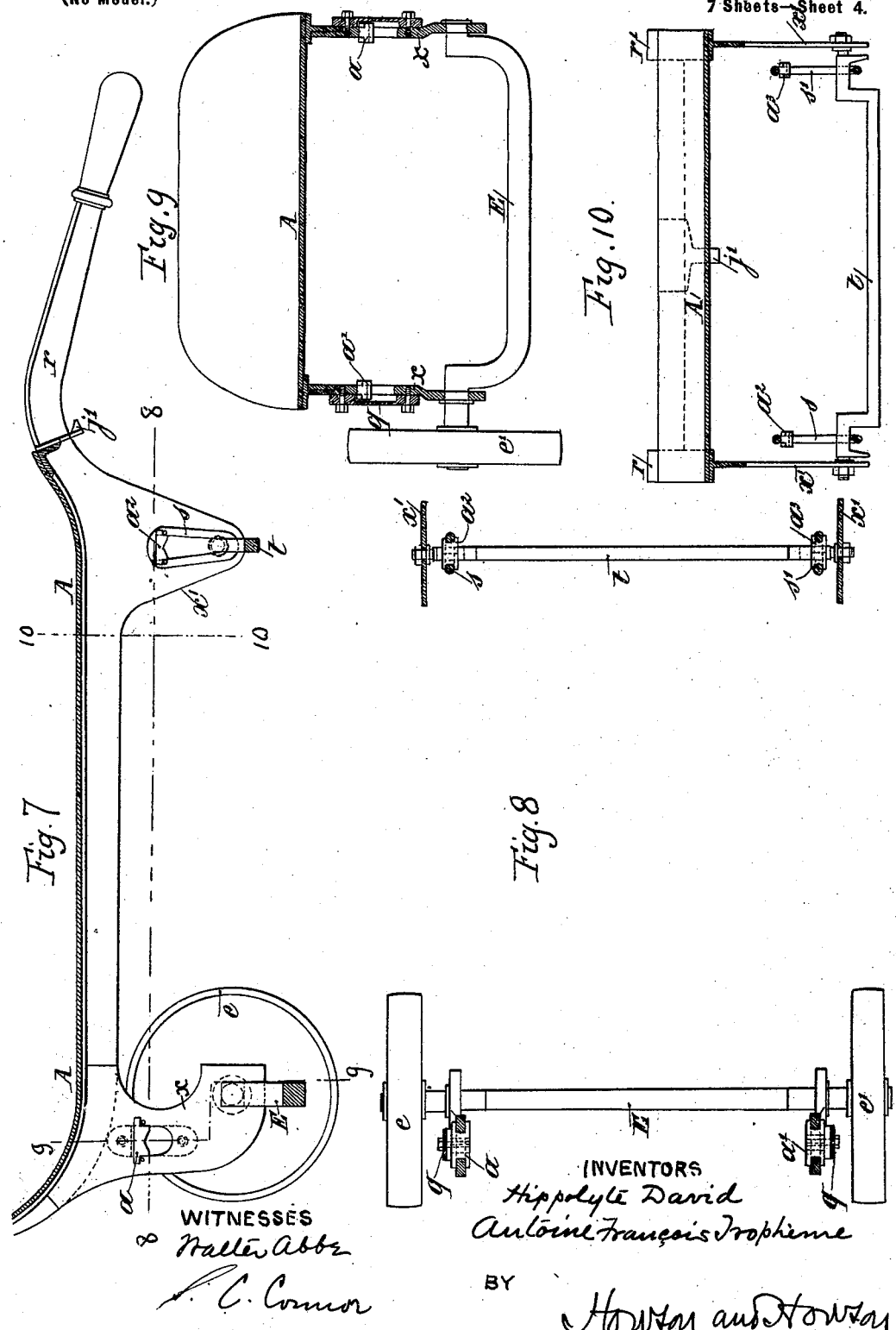
WITNESSES
INVENTORS
Hippolyte David
Antoine François Trophème
BY
Howton and Howton
ATTORNEYS No. 689,040. Patented Dec. 17, 1901.
H. DAVID & A. F. TROPHÈME.
WEIGHING APPARATUS COMBINED WITH A BARROW.
(Application filed Sept. 15, 1897.)
(No Model.) 7 Sheets—Sheet 5.
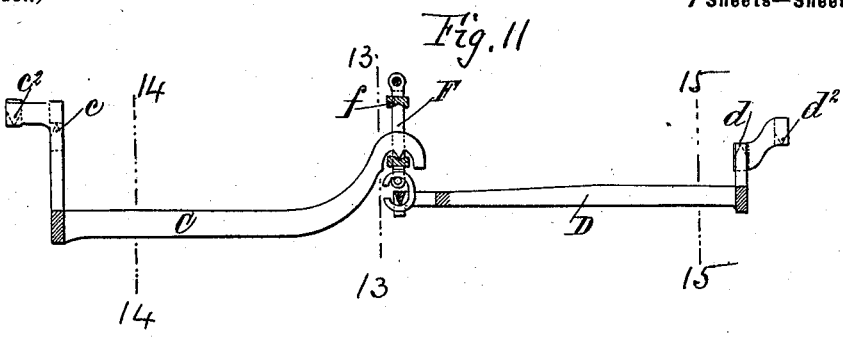
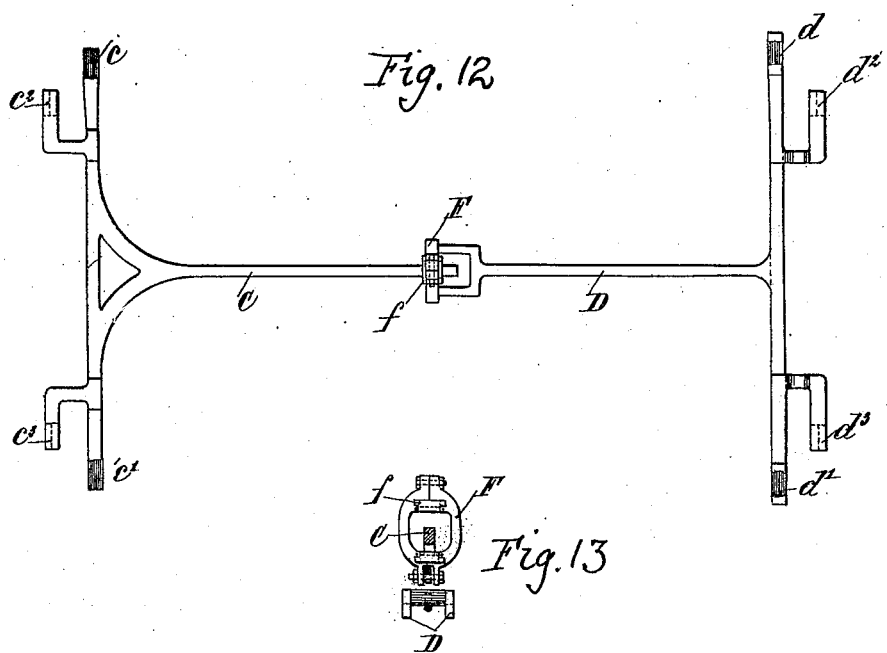
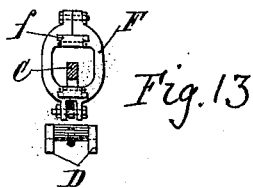
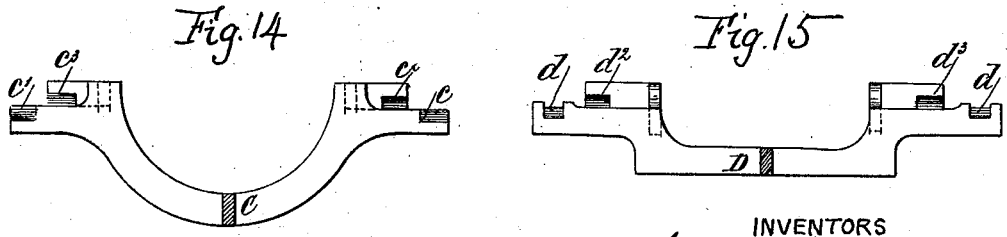
WITNESSES
INVENTORS
Hippolyte David
Antoine François Trophème
BY
Howson and Howson
ATTORNEYS No. 689,040. Patented Dec. 17, 1901.
H. DAVID & A. F. TROPHÈME.
WEIGHING APPARATUS COMBINED WITH A BARROW.
(Application filed Sept. 15, 1897.)
(No Model.) 7 Sheets—Sheet 6.
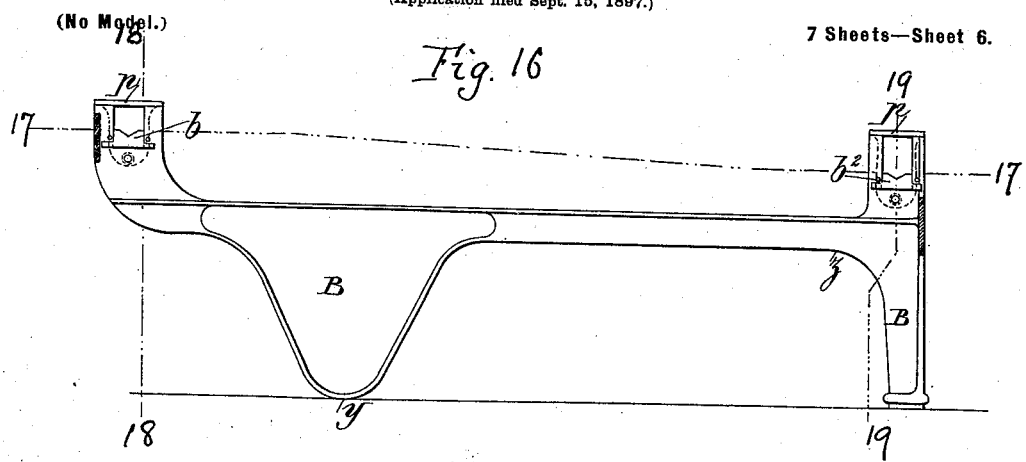
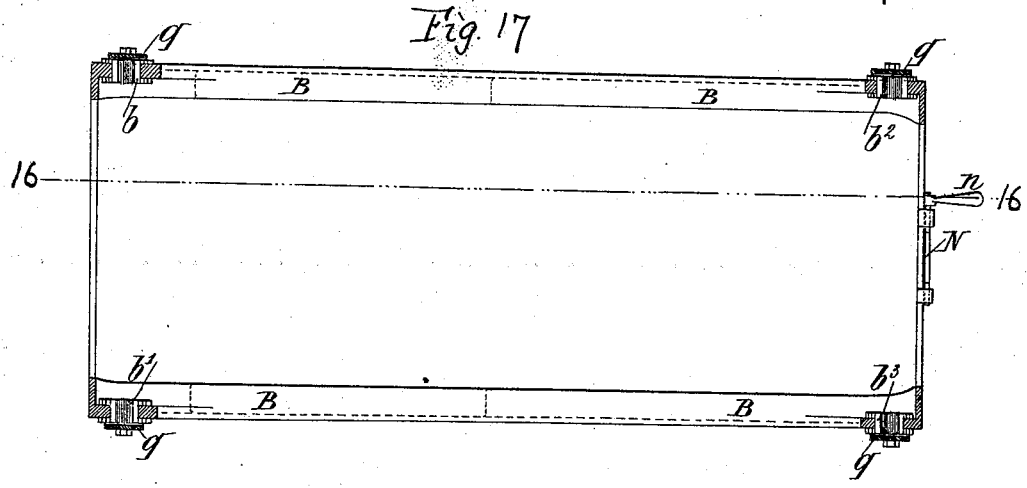
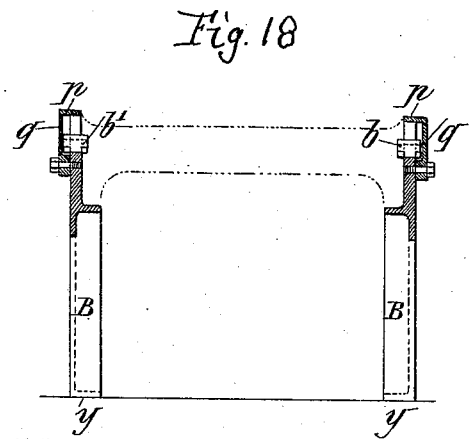
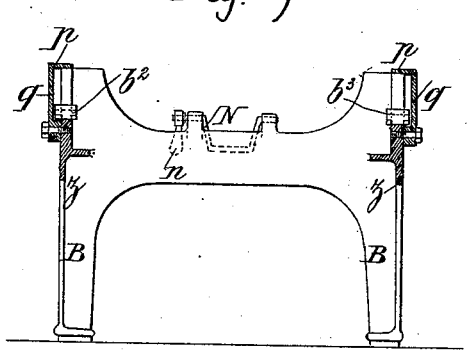
WITNESSES
Walter Abb
S. C. Connor
INVENTORS
Hippolyte David
Antoine François Tophème
BY Howton and Howton
ATTORNEYS No. 689,040. Patented Dec. 17, 1901.
H. DAVID & A. F. TROPHÈME.
WEIGHING APPARATUS COMBINED WITH A BARROW.
(Application filed Sept. 15, 1897.)
(No Model.) 7 Sheets—Sheet 7.
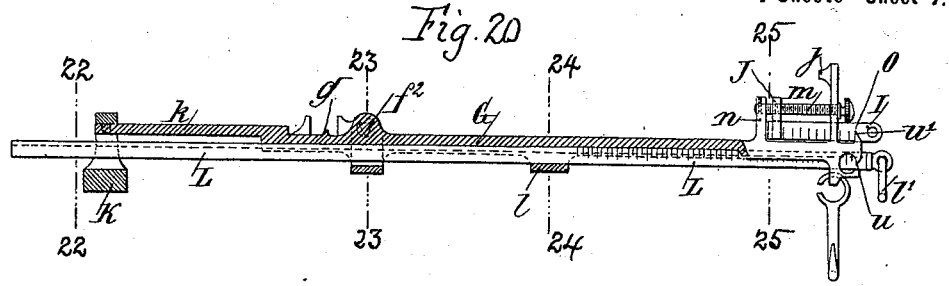
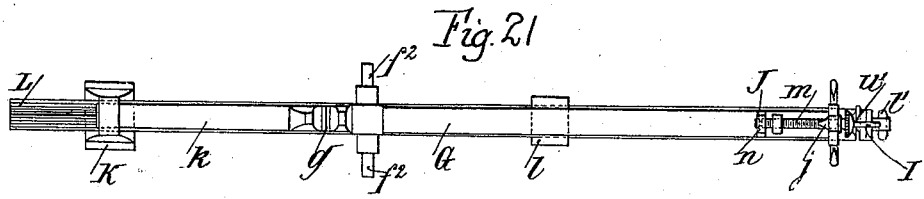
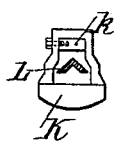
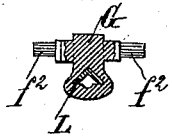
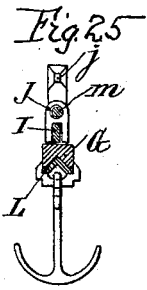
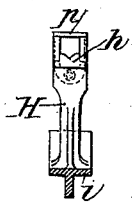
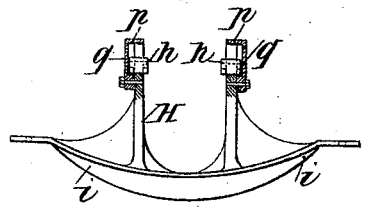
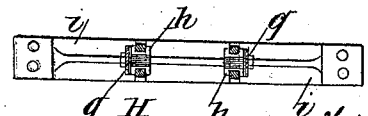
WITNESSES
Walter Abbr
S. C. Connor
INVENTORS
Hippolyte David
Antoine François Trophème
BY Howson and Howson
ATTORNEYS
THE NORRIS PETERS CO., PHOTO-LITHO., WASHINGTON, D. C.

UNITED STATES PATENT OFFICE.

HIPPOLYTE DAVID AND ANTOINE FRANÇOIS TROPHÈME, OF GRENOBLE, FRANCE.

WEIGHING APPARATUS COMBINED WITH A BARROW.

SPECIFICATION forming part of Letters Patent No. 689,040, dated December 17, 1901.

Application filed September 15, 1897. Serial No. 651,750. (No model.)

*To all whom it may concern:*

Be it known that we, HIPPOLYTE DAVID and ANTOINE FRANÇOIS TROPHÈME, manufacturers, citizens of the Republic of France, residing in Grenoble, France, have invented Weighing Apparatus Combined with a Hand-Truck, (for which we have obtained Letters Patent in Belgium, No. 124,656, dated November 19, 1896; in Great Britain, No. 26,169, dated November 19, 1896; in Switzerland, No. 13,250, dated November 25, 1896; in Italy, No. 43,127, dated December 31, 1896; in Spain, No. 19,976, dated January 4, 1897; in France, No. 256,544, dated May 26, 1896, and in Germany, No. 111,733, dated November 20, 1896,) of which the following is a specification.

This invention relates to a weighing apparatus combined with a hand-truck forming a portable weighing apparatus which may be used for both weighing and conveying merchandise.

In the accompanying drawings, Figure 1 represents a longitudinal sectional view of the apparatus. Figs. 2, 3, and 4 are transverse sections on the lines 2 2, 3 3, and 4 4, respectively, of Fig. 1. Fig. 5 shows a horizontal view thereof with the platform of the carriage or truck removed, certain parts being in section. Fig. 6 shows various positions which the apparatus may occupy. Fig. 7 is a longitudinal section of the truck or carriage separate from the weighing-frame. Fig. 8 is a sectional plan view on the line 8 8, Fig. 7. Fig. 9 is a transverse section on the line 9 9, Fig. 7. Fig. 10 is a transverse section on the line 10 10, Fig. 7. Fig. 11 is a longitudinal section through the two main levers forming the connection between the truck and weighing-frame. Fig. 12 is a plan view of said levers. Fig. 13 is a sectional view on the line 13 13, Fig. 11. Fig. 14 is a sectional view on the line 14 14, Fig. 11. Fig. 15 is a sectional view on the line 15 15, Fig. 11. Fig. 16 is a longitudinal section on the line 16 16, Fig. 17, through the weighing-frame apart from the rest of the apparatus. Fig. 17 is a sectional plan view on the line 17 17, Fig. 16, of the same. Fig. 18 is a transverse section on the line 18 18, Fig. 16. Fig. 19 is a transverse section on the line 19 19, Fig. 16. Fig. 20 is a longitudinal section through the balance or scale-beam lever detached from the apparatus. Fig. 21 is a plan view of the same. Fig. 22 is a sectional view on the line 22 22, Fig. 20. Fig. 23 is a sectional view on the line 23 23, Fig. 20. Fig. 24 is a sectional view on the line 24 24, Fig. 20. Fig. 25 is a sectional view on the line 25 25, Fig. 20. Figs. 26, 27, and 28 are sectional views of the fixed support for the scale-beam lever.

This improved weighing apparatus is composed of two distinct parts—a truck or carriage A of appropriate shape and a frame B, which we term the "weighing-frame." These two parts are connected to one another by means of two levers C and D, hereinafter described. The truck or carriage A, provided with handles $r\ r'$, has pendent side pieces $x$ at its forward end, in which the ends of a bent axle E for the truck-wheels $e\ e'$ are fixed, Figs. 1, 2, 7, and 8. When the apparatus is placed in a horizontal position ready for weighing, as represented in full lines in Fig. 1, the carriage A will be supported by the frame B and rest at its front end (by means of bearing-pieces $a\ a'$, Figs. 1, 2, 7, 8, and 9, suitably secured to the side pieces $x$) upon the knife-edges $c\ c'$, which are formed in one with the lever C, Figs. 2, 5, 11, 12, and 14. At the rear of the apparatus the carriage A rests upon knife-edges $d\ d'$ on the lever D, Figs. 11, 12, and 15, through the medium of supporting-links $s\ s'$ and having bearings $a^2\ a^3$ in their upper ends, Figs. 1, 3, 7, and 10. At their lower ends these links support the cross-bar $t$ of the carriage A, this cross-bar being bolted to pendent side pieces $x'\ x'$ of the carriage and passing beneath the portion $z$ of the weighing-frame B, Fig. 3.

The weighing-frame B is an open rectangular frame mounted on four legs, Figs. 16 to 19, and having at its four corners upwardly-projecting parts containing the knife-edge bearings $b\ b'$ and $b^2\ b^3$ for the knife-edges $c^2\ c^3$ and $d^2\ d^3$ of the levers C and D, Figs. 1, 5, 11, and 12. The knife-edges $c^2\ c^3$, resting upon the bearings $b\ b'$, constitute the fixed fulcrum of the lever C, and in like manner the knife-edges $d^2\ d^3$, resting upon the bearings $b^2\ b^3$, constitute the fixed fulcrum of the lever D. These levers C and D are approximately T-shaped in plan view, as illustrated in Fig. 12, with their free ends overlapping and having there knife-edges which find bearings in a supporting-piece F, Figs. 11, 12, and 13, which in turn is suspended from the scale-beam lever G by means of a bearing $f$, resting upon a knife-edge $g$ on the upper side of the lever G, Figs. 1 and 20. This scale-beam lever G lies longitudinally of the apparatus and is supported by and pivoted to the upper part of the brackets H, carried by or formed in one with the cross-piece $i$, which is bolted to the frame B, Figs. 1, 4, 5, 26, 27, and 28. For this purpose the brackets H are provided with bearing-pieces $h$, upon which rest the knife-edges $f^2$ of the longitudinal lever G. The forward end of the longitudinal lever G terminates under the carriage A in a rod $k$, on which a weight K is fixed, by a screw or otherwise, to serve as an adjustment, Figs. 20 and 22. The other end of the same lever G projects just beyond the truck-frame A and between the handles $r\ r'$, and it is there provided with an index-finger $j$, which on the movement of the lever G will move relatively to another index-finger $j'$, fixed on the truck-frame A. The balance-beam L is carried by this lever G and is arranged so that it can slide longitudinally in or on the lever. This balance-beam L is provided with numbered divisions to indicate weight in kilograms or other units. It is held in place by a part of the lever G, where it passes through the frame H, and by a guide-piece $l$, connected to or integral with the lever G, which surrounds it, Figs. 20, 23, and 24. It can be slid longitudinally in the lever G by means of the ring $l'$, secured to one end.

Above the lever G and resting upon the said lever is a longitudinally-movable piece I, Figs. 1 and 3, provided with divisions representing hectograms or other fractional parts, (indicated by the finger $u'$.) An adjusting-screw $m$, Figs. 1, 5, 20, and 21, turning freely in the index-finger $j$ and in a lug $n$, carried by the said lever G and threaded into a projection J on the piece I, serves to displace the piece I to aid in determining exactly the weight of the article to be weighed.

On the weighing-frame B a double-cranked piece N, Figs. 1, 3, 5, and 17, is mounted on a shaft. This double-cranked piece is actuated by a lever or handle $n'$ and serves to fix the various movable parts of the apparatus in position by lifting the balance-beam L and therewith the lever G, Fig. 6.

When an object is to be weighed, the apparatus is placed in a horizontal position. The different constituent parts are so calibrated that in this position the levers of the weighing apparatus will be in equilibrium and the two fingers $j$ and $j'$ exactly coincident when the balance-beam L has its zero-mark O coincident with the small index-finger $u$, Fig. 1, at the end of the lever G and movable piece I has its zero-mark O opposite to the pointer $u'$. When the object to be weighed is placed on the carriage A, pressure is transmitted through the knife-edges $c\ c'\ d\ d'$ to the levers C and D, which are thus displaced on their fixed fulcra $c^2\ c^3\ d^2\ d^3$, and their inner ends descend under this weight, carrying along with them the supporting-piece F, thereby tilting the longitudinal lever G, with the balance-beam L, on the knife-edges $f^2\ f^2$ as a fulcrum and so throwing the index-fingers $j$ and $j'$ out of register with each other. To return the weighing apparatus to the position of equilibrium, the balance-beam L is drawn out until the lever G descends to bring its finger $j$ in line with the fixed finger $j'$. If the weight of the object does not correspond to an exact number of kilograms or other units, the small movable scale I is then displaced by the screw $m$ until perfect equilibrium of the apparatus is obtained. The figures which are then indicated on the said movable scale I and on the balance-beam L by the two pointers $u\ u'$ give the exact weight of the object resting on the carriage A.

It will be observed that when the apparatus is in the position for weighing the wheels $e$ and $e'$ of the carriage A are suspended a certain distance above the ground and are structural parts with the carriage, Fig. 1. When the apparatus is to be moved or when any object or load is to be transported thereon, the rear of the apparatus can be raised by means of the arms $r\ r'$ and can be made to occupy any position between the intermediate position indicated by dotted lines in Fig. 6 and that represented as nearly upright in the same figure. When the apparatus is brought out of the weighing position into an intermediate position, the wheels $e\ e'$ are gradually brought into contact with the ground as the apparatus is turned upon the lower portions $y$ of the forward legs of the frame B, which will be suspended from the truck A when the wheels of the truck rest on the ground. As the carriage A is raised to the trucking position the transverse bar $t$ of the carriage is lifted into contact with the under side of the portion $z$ of the said weighing-frame B, which is then supported by the transverse bar.

An important advantage of the described manner in which the carrier is lifted is that the various swinging or balancing parts are free to move and can incline themselves according to the positions given to the apparatus. Owing to this freedom of movement of these swinging or balancing parts and to the fact that the weighing-frame is supported by the cross-bar $t$, the levers and their knives are subject to no strain during the trucking of merchandise by the apparatus.

To confine the several knife-edges in their respective bearings, we provide cover-plates $p$ and $q$ to be bolted to the frame to prevent lateral or vertical displacement, Figs. 1, 2, 3, 16, 17, 18, 19, and 27.

We claim as our invention—

1. A combined truck and weighing apparatus comprising a wheeled truck having handles at one end and a weighing-frame adapted to support the truck when in the weighing position, levers secured at either end of the weighing-frame forming a connection between the said truck and frame, said levers terminating beneath and midway between the ends and the sides of the truck, and a longitudinal lever suitably connected to said levers at their terminating ends and acted on by the said levers, itself terminating between the handles at one end, and carrying a longitudinally-adjustable scale-beam, substantially as described.

2. A combined truck and weighing apparatus, comprising a wheeled truck having handles and a weighing-frame adapted to support the truck, when in the weighing position, levers having knife-edge bearings at each end of the weighing-frame and extending toward the center thereof and a link F at the center in which the levers are hung, a horizontal scale-beam mounted in knife-edge bearings on the weighing-frame and attached to said link and terminating between the handles at one end, the wheeled truck having knife-edge bearings adapted to rest on the levers to support the truck and means secured to the truck to cause the weighing-frame to swing into such position when transporting a load that the strain will be removed from the knife-edges, as and for the purpose described.

In testimony whereof we have signed our names to this specification in the presence of two subscribing witnesses.

HIPPOLYTE DAVID.
ANTOINE FRANÇOIS TROPHÈME.

Witnesses:
VICTORES BOUEHAYES,
AUGUSTE BOIS.